Sept. 27, 1955　　C. P. VAN DIJK ET AL　　2,719,143
PROCESS FOR POLYMERIZING UNSATURATED
COMPOUNDS IN AN AQUEOUS MEDIUM
Filed Jan. 5, 1952
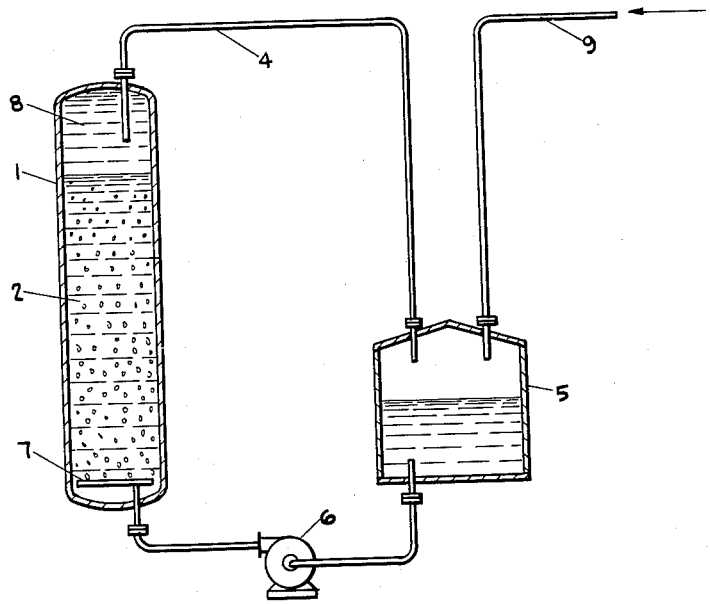
Fig. I
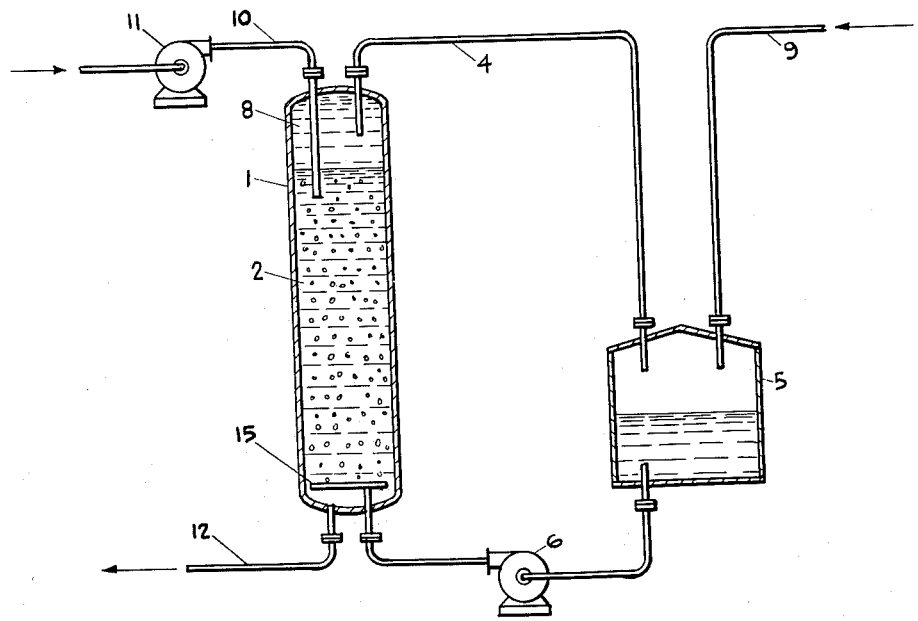
Fig. II
Inventors: Christiaan Pieter Van Dijk
Franciscus Fredericus Van Der Plas
By Their Attorney: C. J. Ott United States Patent Office
2,719,143
Patented Sept. 27, 1955

2,719,143

PROCESS FOR POLYMERIZING UNSATURATED COMPOUNDS IN AN AQUEOUS MEDIUM

Christiaan Pieter van Dijk and Franciscus Johannes Fredericus van der Plas, Amsterdam, Netherlands, assignors to Shell Development Company, Emeryville, Calif., a corporation of Delaware Application January 5, 1952, Serial No. 265,171

Claims priority, application Netherlands January 10, 1951

14 Claims. (Cl. 260—86.3)

This invention relates to a process for polymerizing unsaturated compounds in an aqueous medium. More particularly, the invention relates to a novel process for polymerizing ethylenically unsaturated compounds in an aqueous medium which process can be varied to produce polymers having a predetermined range of molecular weights.

Specifically, the invention provides an economical and highly efficient process for polymerizing substantially water-insoluble ethylenically unsaturated compounds in an aqueous medium to form polymers having a predetermined range of molecular weights, which comprises adding in controlled proportions drops of the desired unsaturated compound and a liquid non-polymerizable substance, such as pentane, to a liquid aqueous medium which contains a polymerization catalyst and is being maintained at a polymer-producing temperature, under such conditions that the said drops of unsaturated compound and non-polymerizable substance will rise or fall through the aqueous medium due to the difference in density of the drops and aqueous medium.

In our copending application Ser. No. 201,536, filed December 19, 1950, now U. S. Patent No. 2,618,626, there is described and claimed a process for polymerizing substantially water-insoluble compounds in an aqueous medium which comprises conducting drops of the compound in contact with and through a liquid medium which contains a polymerization catalyst and an emulsifying agent and is being maintained at a polymerizing temperature. The monomer drops that pass through the aqueous medium are then collected into a separate monomer phase and transported outside the chamber filled with the aqueous phase back to the point of supply for the drops.

The process described in our above-mentioned copending application presents many important advantages over known polymerization methods. The process permits, for example, better control over the polymerization temperature as the heat of reaction may be removed by cooling the externally circulated monomer rather than by cooling the reaction chamber itself. Secondly, the unique step of circulating the monomer droplets through the reaction mixture avoids the necessity of using mechanical stirring and this in turn brings about an improvement in the physical properties of the resulting polymer as well as decreases or eliminates the formation of polymer deposits on the walls of the reaction chamber. Finally, the passage of monomer droplets through the water provides better control over the concentration of the monomer in the said water phase.

The process described in our copending application can be regulated so as to produce polymers having different molecular weights, such as, for example, by the addition of chain transfer agents to the aqueous medium, but the operation of the process in this manner is not particularly convenient. It has been possible but not very convenient, for example, to use the process to produce low molecular weight polymers, e. g., those having molecular weights below about 15,000, such as are of value in the plasticization and lubrication fields.

It is an object of the invention, therefore, to provide an improved process for polymerizing substantially water-insoluble ethylenically unsaturated compounds in an aqueous medium. It is a further object to provide a process for polymerizing unsaturated compounds in an aqueous medium that can be easily controlled to produce polymers having a predetermined range of molecular weights. It is a further object to provide a process for producing relatively low molecular weight polymers in an aqueous medium. It is a further object to provide an improved method for polymerizing normally gaseous monomers such as ethylene, in an aqueous medium without the use of excessive pressures. It is a further object to provide a method for producing low molecular weight polymers that has improved temperature control and can be accomplished with little or no mechanical stirring. It is a further object to provide an improved process for producing low molecular weight relatively homogeneous copolymers.

These and other objects of the invention will be understood from the following detailed description thereof and from the accompanying drawing wherein Figure I illustrates one embodiment of an apparatus for conducting the process of the invention in a batchwise manner, and Fig. II represents another embodiment of an apparatus for conducting the process on a continuous basis.

It has now been discovered that these and other objects may be accomplished by the process of the invention which comprises adding in controlled proportions drops of the desired unsaturated compound and a liquid non-polymerizable substance which is miscible with the unsaturated compound but only slightly miscible with the aqueous medium, to a liquid aqueous medium which contains a polymerization catalyst and is being maintained at a polymer-producing temperature, under such conditions that drops of the said unsaturated compound and the non-polymerizable substance will rise or fall through the aqueous medium due to the difference in density of the drops and the aqueous medium. It has been found that by adding the non-polymerizable substance to the aqueous medium in the above-described manner and by varying the proportions between the unsaturated compound and the said non-polymerizable substance, one can produce polymers having a wide range of different molecular weights. Thus, when the non-polymerizable substance is maintained in large excess to the unsaturated compound, the molecular weight of the polymer will be low, and when the amount of the non-polymerizable substance is maintained at a lower level, the molecular weight will be higher. In addition, it has been found that by adding the liquid non-polymerizable substance in the above-described manner normally gaseous monomers, such as ethylene, may be dissolved therein and polymerized in the aqueous medium without the use of excessive pressures that have heretofore been required to keep the monomers in the liquid state. Furthermore, it has been found that the above-mentioned improvements are obtained without loss of any of the advantages of the process described in our copending application, i. e., the process provides improved heat control, causes little or no polymer deposits on the reaction wall, avoids use of mechanical stirring, and yields polymers having improved properties.

The non-polymerizable substance to be added to the aqueous medium with the ethylenicaly unsaturated monomer may be any liquid non-polymerizable material that is miscible with the unsaturated compounds and is only slightly miscible with the water medium. The preferred non-polymerizable substances are those having a solubility in the water-phase varying from 0.01 part to 40 parts per 100 parts by weight of water at room temperature, and more preferably a solubility varying from 0.1 part to 20 parts per 100 parts of water.

The substance added should also be non-polymerizable, i. e., it should not possess any polymerizable linkages, such as ethylenic linkages, that would permit the substance to enter the polymerization reaction.

Examples of suitable non-polymerizable substances include the liquid hydrocarbons, such as pentane, hexane, cyclopentane, cyclohexane, octane, benzene, toluene, xylene, and the like; alcohols, such as hexyl alcohol, decyl alcohol, isoheptyl alcohol, heptyl alcohol, octyl alcohol, nonyl alcohol, cyclohexanol, cyclopentanol, tetrahydropyran-2-methanol; ketones, such as dihexyl ketone, dicyclohexyl ketone, amyl hexyl ketone, dioctyl ketone, and dinonyl ketone; ethers, such as dihexyl ether, amyl hexyl ether, dioctyl ether, amyl nonyl ether, and diheptyl ether; esters, such as butyl acetate, butyl caproate, octyl propionate, dioctyl malonate, dibutyl succinate, dioctyl phthalate, and the like, and mixtures thereof.

Preferred non-polymerizable substances comprise the saturated hydrocarbons containing from 5 to 16 carbon atoms, the saturated monohydric alcohols containing from 5 to 10 carbon atoms, the saturated aliphatic ketones containing from 6 to 12 carbon atoms, the saturated aliphatic ethers containing from 6 to 12 carbon atoms, and the saturated monocarboxylic and dicarboxylic acid esters containing from 4 to 16 carbon atoms.

Especially preferred are those non-polymerizable substances that effect a considerable reduction, e. g., 3% to 12% in the solubility of monomer in the aqueous medium.

If no emulsifying agent is present in the reaction mixture, it is also preferred to employ non-polymerizable substances that are relatively non-solvents for the resulting polymer.

Coming under special consideration as non-polymerizable substances to be used in the process, particularly because of the excellent results obtained therewith, are the liquid saturated aliphatic hydrocarbons containing from 4 to 10 carbon atoms, such as, pentane, hexane, octane, nonane, and mixtures thereof.

The process of the invention is conveniently effected in a reaction chamber which is in the form of a vertical column. The column is nearly filled with the aqueous medium, and then the monomer and the aforedescribed non-polymerizable substance are introduced in contact therewith as drops with the aid of an entering means which is preferably a distributing device containing a plurality of apertures through which the drops enter into contact with the aqueous medium. The entrance aperture or apertures can have a diameter of say 0.2 to 20 mm. and are usually 2 to 10 mm. The entering means is placed at one end of the reaction chamber so that the drops flow away from the said means. At the opposite end, the drops which have passed clear through the aqueous phase are collected into an integral phase which is maintained as a layer in contact with the aqueous phase. The rate of separation of the drops into the monomer phase from the aqueous phase increases with the area of the interface between the two phases. It is, therefore, generally desirable to have the interface positioned in the reaction chamber at a point of largest cross-sectional area. This can be achieved in a column-shaped chamber by having the chamber fitted with a region of enlarged cross-section which is perpendicular to the axis of flow of the drops. This enlarged portion will be located either at the top or bottom of the main column, as the case may require. The separation of the two phases may also be carried out in a separation chamber or adequate cross-sectional area which is apart from the reaction chamber.

Although generally a column-shaped reaction chamber is preferred, the process may also be carried out in a reaction space, the horizontal dimensions of which are larger than its height.

According to the process of the invention, drops of the unsaturated compounds and the non-polymerizable substance are passed in contact with and through the aqueous medium. The unsaturated compound and the non-polymerizable substance may be added to the aqueous medium separately or these components may be added in admixture. In most cases, it is preferred to add the unsaturated compound and the non-polymerizable substance in admixture as this permits better control over the concentrations of these two components.

The term "drops" as used throughout the specification and claims means liquid globules that are of such size that they are clearly visible as distinct entities to the unaided human eye and are thus distinguishable from monomer "droplets," which is a term employed to designate the minute monomer globules present in the aqueous emulsion processes. The droplets in the emulsion are so small as to be subject to the Brownian movement, while the drops of monomer and non-polymerizable substance used in the present invention are so large as to be unaffected by this movement and move through the aqueous medium only by floating or sinking realized from the difference in the density of the drops and the aqueous medium. The drops preferably have a diameter of about 0.1 to 2 centimeters and more preferably from 0.1 to 1 centimeter.

If the unsaturated compound and the non-polymerizable substance are lighter than the water phase, they will be introduced at the bottom of the reaction vessel so that they might rise through the aqueous medium due to the difference in density of the drops and the medium and preferably be collected at the top as a separate phase. On the other hand, if the unsaturated compound and the non-polymerizable substance are heavier than the water phase, they will be introduced at the top of the reaction vessel. If the unsaturated compound and the non-polymerizable substance are added separately and have different densities, i. e., one is lighter and the other heavier than water, it is possible to introduce the lighter component at the bottom and the heavier one at the top and collect the separate phases at opposite positions in the reaction vessel.

The ratio in which the unsaturated compound and the non-polymerizable substance are added to the aqueous medium may vary over a wide range depending on the type of monomer selected and the desired molecular weight. As indicated above, if low molecular weight polymers are desired, the non-polymerizable substance should be added in relatively large quantities in relation to the unsaturated monomer, and if higher molecular weight products are desired, smaller quantities of the non-polymerizable substance should be employed. For low molecular weight products, the monomer and non-polymerizable substance are preferably employed in weight ratios varying from 1:1 to 1:5, and more preferably from 1:1.5 to 1:3. The higher molecular weight products, on the other hand, are preferably obtained by employing the monomer and non-polymerizable substance in weight ratios varying from 1:1 to 1:0.1, and more preferably from 1:1 to 1:0.3.

The rate at which the drops of the monomer and non-polymerizable substance are added to the aqueous medium may vary over a considerable range. When the aqueous medium employed contains an emulsifying agent, there is usually at the beginning of the process a layer of concentrated emulsion at the interface of separation between the aqueous phase and monomer layer. Upon continuing the operation until the aqueous phase contains an appreciable proportion of emulsified polymer, e. g., 1% or more, the concentrated emulsion layer practically disappears. To avoid considerable growth of the concentration emulsion layer at the start, when using an aqueous emulsion medium, it is desirable to keep the initial rate of introduction of the drops comparatively low. When the concentrated emulsion layer has been reduced on account of formation of polymer, the rate of introduction can be increased.

The linear velocity of the drops when entering the water phase should preferably be not more than 30 cm. per second, and more preferably not more than 12 cm. per second. Increase of the linear speed beyond 30 cm. per second may decrease the size of the drops and impair the uniformity of the drops and consequently also impair the rate at which the drops separate from the water phase and join to integral monomer and non-polymerizable phase or phases.

The amount of aqueous medium through which the drops of unsaturated compound and non-polymerizable substance are allowed to rise or fall may vary over a wide range. In most cases, the medium is so regulated as to permit a recovery of a great part of the drops in a separate phase at the opposite end of the reaction chamber. As the monomer is being consumed in the polymerization reaction in the aqueous medium, there will be some diffusion, e. g., only about 0.1% to about 10%, of the monomer into the medium per pass, and the rest of the monomer will be recovered in the separate phase per pass. In a batchwise operation wherein there is no removal of the aqueous medium, there will be little loss of the non-polymerizable substance to the said medium, and after the process has started substantially all of the material, e. g., 98% to 100%, may be recovered in the separate phase. In a continuous operation, however, when portions of the aqueous medium are being removed, there will be some loss of the non-polymerizable substance, e. g., 1% to 15%, due to removal of the dissolved non-polymerizable substance with the polymer-containing aqueous phase.

If the monomer and the non-polymerizable substance both have the same relative densities, i. e., both heavier or both lighter than the water phase, and are added separately or in admixture, they will be recovered in the same separate phase in contact with the aqueous medium. However, if one is lighter than water and the other heavier, it may be possible to collect them as separate phases.

The monomer and non-polymerizable substance collected in the separate phase or phases in contact with the aqueous medium are preferably recycled back to the point of introducing such components in the reaction chamber. If the monomer and non-polymerizable substance are recovered in a single phase and the concentration of these components in that phase are different from that in which they are to be introduced, due to the different rates of diffusion in the said medium, it may be necessary to bring the concentrations back to the desired level by adding either or one of both components before the mixture is returned to the reaction chamber. For this purpose, the monomer and non-polymerizable substance may be taken to a separate container where they may be mixed with the required quantities of the make-up components.

The recycling of the monomer and/or non-polymerizable substance may be accomplished in any manner but is preferably accomplished by means of an outside conduit so that there will be opportunity to cool the components before they are introduced into the reaction mixture. As indicated above, this cooling of the recycled monomer and/or non-polymerizable substance offers a splendid opportunity for heat control of the polymerization reaction.

It is also advantageous in many cases to subject the circulating monomer and non-polymerizable substance to a washing operation before returning them as drops to the polymerization zone. For this purpose, washing with water gives good results and is easily effected by bringing the drops into contact with a column of water, conducting the drops through the water, and then collecting the passed drops into an integral layer for transportation to the reactor.

The addition of new monomer and non-polymerizable substance or recirculation of the old is continued until the aqueous medium contains an appreciable quantity of polymer, e. g., 10% to 50%, and more preferably from 10% to 20%, and then the reaction is preferably stopped, or continued on a continuous basis by removing portions of the aqueous medium containing the polymer. This is accomplished by removing portions of the medium, preferably at about the rate at which the polymer is being formed, and then adding water, catalyst and other necessary components. The aqueous phase is preferably kept at a constant level by adding approximately the same amount of aqueous phase as drawn off. Moreover, the concentrations of catalyst and other ingredients are preferably maintained substantially constant in the aqueous phase by adding fresh quantities. This is conveniently accomplished by using as feed a stock supply of aqueous phase which contains a polymerization catalyst and other ingredients in the desired proportions. If desired, however, one or both of these auxiliary constituents may be added separately from the aqueous feed.

In removing portions of the aqueous phase, the best results are obtained by having the place or places of withdrawal located in a region free of moving monomer drops such as at the side of the reactor, which may be behind a shield, or more preferably, in an end region behind the monomer distributing device which is located somewhat removed from end of the reactor opposite the monomer phase collecting region.

The process of the invention may be better understood by considering the accompanying drawing wherein Figs. I and II are diagrammatic representations of two embodiments of the process.

Fig I represents a batchwise method of operating the process wherein the unsaturated monomer and non-polymerizable substance are lighter than water and are added in admixture. Column-shaped reaction chamber 1 is largely filled with aqueous phase 2 containing the polymerization catalyst and other desired ingredients. Over the aqueous phase is a layer of the mixture of monomer and non-polymerizable substance. The mixture of monomer and non-polymerizable substance is circulated through conduit line 4 to reservoir 5 where fresh monomer and non-polymerizable substance are added in proportions necessary to bring the concentrations of the components in the recycle line up to the desired level. The resulting mixture is then taken by means of pump 6 to distributing device 7 from which device it moves upwards in coarse drops through the aqueous phase. In the case where the monomer is heavier than the water phase, the distributing device is fitted in the top section of the reaction chamber, monomer layer separates beneath the aqueous phase, and the direction of flow in the recycle line is reversed.

Fig. II represents a continuous method of operating the process wherein the unsaturated monomer and the non-polymerizable substance are both lighter than water and are added in admixture. The apparatus is substantially the same as that shown in Fig. I with the exception that fresh aqueous phase containing the catalyst and other ingredients is fed through line 10 by pump 11 and formed aqueous polymer dispersion is withdrawn behind distributing device 15 via line 12.

The monomers to be polymerized or copolymerized by the process of the invention comprise the substantially water-insoluble ethylenically unsaturated organic compounds. The expression "substantially water-insoluble" as used throughout the specification and claims in relation to the monomer to be polymerized, refers to those monomers which have at least some solubility in water so that some of the monomer may enter the aqueous medium but still have so little solubility in water that they are regarded as being relatively water-insoluble. Preferably, the monomers have a solubility in water at room temperature of from 0.1 part to 20 parts per 100 parts of water. Particularly preferred monomers are those having a solubility of from 0.1 part to 14 parts per 100 parts by weight of water.

The expression "ethylenically unsaturated," as used throughout the specification and claims, refers to those monomers possessing one or more polymerizable ethylenic groups in their molecule. Examples of such monomers include ethylene, maleic acid, maleic acid esters, tetrahaloethylene, butadiene - 1,3, dimethyl - butadiene - 1,3, piperylene, isoprene, chloroprene, styrene, alpha-methyl styrene, dichlorostyrene, vinyl phenol; esters of unsaturated acids, such as methyl acrylate, butyl acrylate, cyclohexyl 3-butenoate, hexyl acrylate, octyl acrylate, methyl methacrylate, butyl methacrylate, and propyl acrylate; the vinylidene halides such as vinylidene chloride and vinylidene bromide; the vinyl esters of inorganic acids such as vinyl chloride and vinyl bromide; the unsaturated nitriles, such as methacrylonitrile and acrylonitrile; the vinyl esters of monocarboxylic acids, such as vinyl acetate, vinyl caproate, vinyl chloroacetate, vinyl benzoate, and vinyl valerate; the vinyl esters of polycarboxylic acids, such as divinyl succinate, divinyl adipate, vinyl allyl phthalate, diallyl phthalate; the vinyl esters of the unsaturated acids, such as vinyl acrylate, vinyl crotonate, and vinyl methacrylate; the vinyl ethers, such as vinyl ethyl ether, vinyl butyl ether; and vinyl ketones, such as vinyl hexyl ketone, and vinyl octyl ketone.

Preferred monomers to be polymerized or copolymerized by the process of the invention comprise the vinylidene monomers containing a polymerizable $CH_2=C=$ group and no other polymerizable group, such as vinyl chloride, vinylidene chloride, vinyl butyrate, ethyl acrylate, styrene, methyl-styrene, allyl acetate, allyl butyrate, acrylonitrile, methacrylonitrile, isobutylene, and the like. Especially preferred are those monomers having a molecular weight below about 225.

Of special interest, particularly because of the fine quality of the polymers that may be prepared therefrom by the process of the invention, comprise the members of the group consisting of ethylene, vinyl chloride, vinylidene chloride, butadiene, styrene, alpha-methyl styrene, acrylonitrile, methacrylonitrile, the alkyl esters of acrylic acid, and the vinyl esters of the alkanoic acids.

The composition of the aqueous medium to which the monomer and non-polymerizable substance are added may vary depending chiefly on the form in which the resulting polymer is desired. If the polymer is desired in the form of a stable emulsion, the medium may contain an emulsifying agent and a suitable catalyst. If the mixture is desired as a dispersion from which the polymer may later settle out, the medium may contain a water-soluble catalyst and small quantities of dispersing agents.

Catalysts used for the emulsion polymerization may be any of the polymerization catalysts that are known to be used for this purpose, such as persulfuric acid, peracetic acid, percarbonic acid, perphosphoric acid, perphthalic acid, the persalts, such as potassium persulfate, the peresters, such as tert-butyl perbutyrate, ditertbutyl dipermalonate and O,O-tert-butyl O-ethyl monopermalonate, the peroxides, such as hydrogen peroxide, sodium peroxide and the like. Other catalysts can be used, such as benzoyl peroxide, tertiary butyl perbenzoate, acetyl benzoyl peroxide, lauryl peroxide, acetone peroxide, etc., if they form part of the well known redox systems of polymerization catalyzers, especially when operating at below about 35° C. Suitable catalyst systems are also combinations of oxygen and salts of sulfurous acid. The water-soluble polymerization catalysts, and more preferably the water-soluble peroxide polymerization catalysts, are the more desirable catalysts to be used for this type of process.

The preferred catalysts to be used for the suspension-type polymerization reaction include the above-described water-soluble catalysts, such as persulfuric acid, peracetic acid, percarbonic acid, perphosphoric acid, potassium persulfate, hydrogen peroxide, sodium peroxide, tert-butyl perbutyrate, and the like, and mixtures thereof.

The amount of the above-described catalysts to be used will vary over a wide range depending upon their type and desired rate of polymerization. In most instances, the amount of catalyst will vary from 0.1% to 5%, and more preferably from 0.1% to 1%, wherein the percentages are by weight based on the aqueous phase.

Dispersing agents that may be used in the process may be exemplified by the following: finely divided clay, talc, barium sulfate, and tricalcium phosphate, methyl cellulose, polyfluoroalkanoic acids, such as, dodecafluoroheptanoic acid, pentadecafluorooctanoic acid, salts of these acids with saturated alkylamines, phosphoric acid esters of polyfluoroalkanols, and the like, and mixtures thereof.

Emulsifying agents used in the aqueous medium may be any of the known ionic or non-ionic type emulsifying materials. Suitable materials include sodium and/or potassium myristate, laurate, palmitate, oleate, stearate, rosinate and/or hydroabietate; or alkali metal alkyl or alkylene sulphates, or sulphonates, such as sodium and/or potassium lauryl sulfate, cetyl sulfate, oleyl sulphonate, stearyl sulphonate, sulphonated Turkey red oil, sulphonated mineral oils, etc., as well as amonium or ethanolamine salts thereof; salts of higher amines and non-ionic emulsifiers, such as described in U. S. 2,322,820. In all cases, it is preferred that the hydrocarbon radical of the emulsifying agent contains 10 to 20 carbon atoms. The amount of the emulsifying agents used may vary over a wide range. Best results are obtained when sufficient amount is present in the aqueous medium that the suspension of polymer is substantially stable. In general, the concentration of emulsifying agent falls within the range of about 0.05 to 2% of the aqueous medium. With an ion-active emulsifier, there is employed in general between 0.01 to 0.2, and more particularly between 0.01 and 0.06 gram equivalents of emulsifier per kilogram of polymer ultimately present in the dispersion. A gram equivalent is the number of grams which is equal to the molecular weight divided by the number of positive (or negative) elementary electric charges formed on ionization of a molecule. Thus, in using sodium cetyl sulphonate as emulsifying agent for production of an aqueous dispersion containing 20% polymer, there is used a starting aqueous medium containing about 0.08 to 1.6%, particularly 0.16 to 0.5% of the emulsifying agent.

Although the temperature of operation in the polymerizing zone can vary during the course of the polymerization, it is preferred to maintain it substantially constant. This is conveniently accomplished by cooling the circulating monomer phase. However, in starting up the polymerization, it may be necessary to apply heat until the polymerization reaction is under way. Once polymerization has started, the temperature is kept constant by cooling, since the polymerization reaction is exothermic. A broad range of temperature is suitable for conducting the polymerization, but in general temperatures of about −20 C. to 90° C. are used, and very good results are obtained with the aqueous medium at about 15° C. to 70° C.

The pressure used in the process should be sufficient to maintain the drops in the liquid state. It is preferred in most cases to maintain sufficient pressure to keep the unsaturated monomer in the liquid phase but this is not essential as it is possible for the monomers to be carried through the aqueous medium dissolved in the non-polymerizable substance. This latter procedure is generally preferred in case the monomer is of the type such as ethylene.

The presence of oxygen generally tends to inhibit the rate of polymerization and, therefore, the reaction medium is preferably kept out of contact with oxygen by use of a closed apparatus and the reactor is purged free of oxygen in starting up.

The method of recovering the polymer will vary depending on the type of medium used. If the polymer is formed as a stable emulsion, the polymer particles may be recovered by any coagulating means, such as freezing or addition of coagulating agents. If the polymer is formed as a less stable dispersion, the particles may be recovered by filtration, extraction, and the like.

Apart from the preparation of homopolymers, the process of the invention is also very suitable for copolymerization. By this is meant the joint polymerization of two or more monomers.

The term unsaturated compound used throughout the specification is meant to include mixtures of compounds as well as the single compound. The invention renders it easy to conduct a copolymerization in such a manner that a homogeneous copolymer is formed—i. e., a copolymer consisting of macromolecules, all composed of monomer molecules in one and the same ratio.

In general different monomers, though they are present in the same concentration, are used up at different speeds in a copolymerization. The ratio in which monomers are present in the reaction mixture consequently shows a tendency to change. An alteration in the ratio of the monomer concentration in the reaction mixture in turn results in the composition of the macromolecules formed being subject to alteration, so that the copolymer becomes what is called heterogeneous.

It is known that in order to obtain homogeneous copolymer, the ratio of the monomers in the reaction mixture must be kept constant, which can best be attained by admixing suitable quantities of all participating monomers, or by admixing suitable quantities of all monomers with the exception of the monomer which in proportion to the total quantity of that particular monomer present, is consumed most slowly. In the process according to the invention, this admixture can take place most efficiently in the monomer circulation line. Preferably a reservoir will be fitted in the circulation line in this case as shown in the attached drawing. The admixture of monomer then takes place preferably in this reservoir or in the part of the circulation line in front of the reservoir. When applying a reservoir the monomer can be admixed both continuously and intermittently.

The following examples are given for the purpose of illustrating the inventive improvement, but it is to be understood that the invention is not to be construed as limited to details described therein.

*Example I*

This example relates to the copolymerization of vinylidene chloride and ethylacrylate using pentane as the non-polymerizable substance.

The polymerization was carried out in a vertically arranged cylindrical reactor having a height of 60 cm. and a diameter of 5.5 cm. The top and the bottom ends of the reactor were connected up by means of a circulation line including a reservoir with a capacity of one liter, a heat exchanger and a pump. At the top of the reactor, the circulation line terminated in a distributing device with four discharge openings of 5 mm. diameter pointing downwards.

The reactor was filled to one quarter with a mixture of vinylidene chloride, ethyl acrylate and pentane in a ratio of 80:20:100 parts by weight and the remaining part filled with a water phase, which contained 0.5% of sodium mersolate, 0.5% of ammonium persulphate and 0.1% of sodium bicarbonate. (Sodium mersolate is a mixture of sodium alkylsulphonates, which is obtained by treating a mixture of saturated aliphatic hydrocarbons, having from 12 to 18 carbon atoms, with chlorine and sulphur dioxide and by saponifying the product of this treatment with sodium hydroxide.) The circulating line as well as the reservoir also contained a mixture of monomers and pentane in the above-described ratio.

The mixture of monomers and pentane was circulated by means of a pump and passed through the water phase from the top to the bottom. The system was raised to a temperature of 30° C. by applying heat at the heat exchanger. After the polymerization process had started, the temperature was maintained at 30° C. by cooling with cold water in the heat exchanger.

After the concentration of the copolymer in the water phase had risen to 20 per cent by weight, fresh water phase was introduced through a conduit discharging at a point half-way up the reactor, while the copolymer suspension formed was discharged at the top. The feed of fresh water phase was regulated in such a manner that the concentration of the copolymer in the water phase was maintained at 20%.

The quantity of the circulating mixture of monomers and pentane was kept up to standard by replenishing with vinylidene chloride, ethyl acrylate and pentane in a ratio of 0:20:4 parts by weight. In this manner the ratio of vinylidene chloride, ethyl acrylate and pentane in the circulating mixture was maintained at 80:20:100.

The rate at which the copolymer was formed was 6 grams per liter of water phase and per hour. The rate of circulation was 35 liters per hour.

For the sake of comparison, the polymerization process was also carried out without pentane. Vinylidene chloride and ethyl acrylate were present at the start and replenished in the course of the copolymerization process in a ratio of 80:20 parts by weight. The rate at which the copolymer was formed in this case was 25 grams per liter of water phase and per hour. The rate of circulation was 25 liters per hour.

The suspensions obtained were coagulated with ethanol. The copolymer was filtered off, washed and dried. Of the copolymers obtained 0.5% solutions in cyclohexanone were prepared. The viscosity of these solutions was determined. In addition, the chlorine content of the dry copolymers was determined.

|  | Viscosity, cps. | Cl-content, percent |
|---|---|---|
| Copolymer I (formed in the presence of pentane) | 2.77 | 46.1 |
| Copolymer II (formed without solvent) | 3.17 | 55.2 |

If the molecular weights of copolymers I and II had been the same, a chlorine content of I smaller than that of II would have been accompanied in the case of I by a higher result of the viscosity determination than in the case of II. Seeing, however, that the viscosity is lower in the case of I than in the case of II, it is evident that the molecular weight of I is considerably lower than that of II.

Similar results are obtained by replacing the pentane in the above-described process with equal amounts of the following: isooctane, didecyl ketone, dioctyl phthalate, cyclohexane, and cyclopentane.

Other homogeneous copolymers are obtained by replacing the vinylidene chloride ethyl acrylate in the above process with equivalent proportions of each of the following monomer mixtures; vinylidene chloride-methyl methacrylate, vinylidene chloride-methacrylonitrile and vinylidene chloride-vinyl acetate.

*Example II*

This example illustrates the homopolymerization of vinylidene chloride using pentane as the non-polymerizable substance.

The cylinder described in Example I above is filled to one quarter with a mixture of vinylidene chloride and pentane in a 1:1 ratio by weight and the remaining part filled with a water phase containing by weight 0.5% ammonium persulfate, 0.25% sodium sulfite, 0.25% sodium bicarbonate and 0.5% sodium mersolate. The circulating line and reservoir also contains a mixture of vinylidene chloride and pentane in the above-described ratio.

The mixture of vinylidene chloride and pentane is circulated by means of a pump and passed through the water phase from the top to the bottom. The system is raised to a temperature of 28° C. by heating in the heat exchanger. After polymerization has started, the temperature is maintained at 30° C. by cooling with cold water in the heat exchanger.

After the concentration of the polymer in the water phase had risen to 20 per cent by weight, fresh water phase is introduced through a conduit discharging at a point half-way up the reactor, while the polymer suspension formed is discharged at the top.

The quantity of the circulating vinylidene chloride and pentane is kept up to standard by replenishing with vinylidene chloride and pentane in the ratio of 100:4 parts by weight. In this manner, the ratio of monomer to pentane in the circulating mixture is maintained at 100:100.

Analysis of the homopolymer of vinylidene chloride obtained in the above process indicates that it has a much lower molecular weight than a similar polymer prepared without the addition of the pentane.

A homopolymer of ethylene is prepared in the same manner as described above by employing pentane containing dissolved ethylene in place of the mixture of vinylidene chloride and pentane.

*Example III*

This example illustrates the homopolymerization of styrene using diheptyl ether as the non-polymerizable substance.

The polymerization in this case is carried out in a cylinder having a height of 60 cm. and a diameter of 5.5 cm. having the top and bottom ends connected up by means of a circulating line including a heat exchanger and a pump. At the bottom of the reactor, the line terminated in a distributing device with four discharge openings of 5 mm. diameter pointing upward.

Three quarters of the reactor is filled with water containing 4% potassium persulfate and 2% sodium bisulfite, and then the rest of the vessel and circulating line filled with a 100:100 mixture of diheptyl ether and styrene.

The mixture of diheptyl ether and styrene is circulated by means of a pump and passed through the water phase from the bottom to the top. The system is raised to a temperature of about 30° C. by heating in the heat exchanger. After the polymerization has started, the temperature is maintained at about 40° C. by cooling with cold water in the heat exchanger.

After the concentration of the polymer has risen to about 20%, fresh water phase is introduced and a portion of the polymer latex removed. The feed of water phase is regulated in such a manner that the concentration of the polymer remains about 20%.

The quantity of circulating diheptyl ether and styrene is kept up to standard by adding a fresh supply of styrene containing the diheptyl ether in the amount that it is used in the process.

Analysis of the homopolymer obtained indicates that it has a much lower molecular weight than a similar polymer prepared without the addition of the non-polymerizable substance.

Similar results may be obtained by replacing styrene in the above-described process with each of the following: acrylonitrile, methacrylonitrile and vinyl chloride.

We claim as our invention:

1. A process for producing a polymer of at least one substantially water-insoluble ethylenically unsaturated organic compound which comprises conducting liquid drops of a solution of the said ethylenically unsaturated compound in a liquid non-polymerizable substance which is miscible with the said unsaturated compound but only slightly miscible with the aqueous medium described hereinafter and contains no polymerizable linkages, in contact with and through a liquid aqueous medium which contains a water-soluble polymerization catalyst wherein a portion of the monomer in the said drops goes into solution in the aqueous medium, and maintaining the aqueous medium at a polymerizing temperature so as to polymerize the dissolved monomer in the aqueous medium in the presence of the said water-soluble catalyst, and at the conclusion of their passage through the aqueous medium collecting the drops of solution of monomer in the non-polymerizable substance as a separate phase in contact with the said aqueous medium, and recycling a portion of the collected drops back to the point of introducing the drops into the aqueous phase, the movement of said drops through the aqueous medium being due primarily to difference in density of the said drops and the medium.

2. A process for producing a polymer of a substantially water-insoluble ethylenically unsaturated organic compound which comprises adding liquid drops of a mixture containing in controlled proportions (1) the unsaturated ethylenically unsaturated compound and (2) a liquid non-polymerizable substance which is miscible with the said unsaturated compound, is only slightly miscible with the aqueous medium described hereinafter, and has the same relative density in relation to the water phase as the unsaturated compound, to and through a liquid aqueous medium which contains a water-soluble polymerization catalyst wherein a portion of the monomer in the said drops goes into solution in the aqueous medium, and heating the aqueous medium to a polymerizing temperature so as to polymerize the dissolved monomer in the water medium in the presence of the said water-soluble catalyst, and at the conclusion of their passage through the aqueous medium collecting the drops as a separate phase in contact with the said medium and recycling a portion of the collected drops back to the point of introduction of the liquid drops into the aqueous medium, the movement of said drops through the medium being due primarily to difference in density of said drops and the medium.

3. The process as defined in claim 2 wherein the non-polymerizable substance is a liquid component of the group consisting of saturated hydrocarbons containing from 5 to 16 carbon atoms, saturated monohydric alcohols containing from 5 to 10 carbon atoms, saturated aliphatic ketones containing from 6 to 12 carbon atoms, saturated aliphatic ethers containing from 6 to 12 carbon atoms, and saturated monocarboxylic and dicarboxylic acid esters containing from 4 to 16 carbon atoms.

4. The process as defined in claim 2 wherein the unsaturated monomer is vinylidene chloride.

5. A continuous process for producing a polymer of a substantially water-insoluble ethylenically unsaturated organic compound which comprises passing liquid drops of a mixture containing controlled proportions of (1) the said ethylenically unsaturated compound and (2) a liquid non-polymerizable substance which is miscible with the said unsaturated compound, is only slightly miscible with the aqueous medium described hereinafter, reduces the solubility of the unsaturated compound in the aqueous medium, and has the same relative density in relation to the water phase as the unsaturated compound, in contact with and through a liquid aqueous medium which contains a water-soluble radical-yielding polymerization catalyst and an emulsifying agent wherein a portion of the monomer in the drops goes into solution in the aqueous medium, heating the aqueous medium to a polymerizing temperature as to polymerize the dissolved monomer in the aqueous medium in the presence of the said water-soluble catalyst, collecting all of the drops that pass through the aqueous medium at the opposite end of the reaction chamber as a separate phase in contact with the said aqueous medium, the monomer collected being at least 90% of that introduced into the aqueous medium removing part of the said collected phase to a reservoir where the concentration of the components is adjusted and then circulating the liquid back to the point of introducing the drops in the aqueous medium, removing a portion of the aqueous medium containing the formed polymer and adding to the aqueous medium water, catalyst and emulsifying agent to make up for that withdrawn with the polymer, the movement of the said drops through the medium in the above-described process being due primarily to difference in density of said drops and the medium.

6. The process as defined in claim 5 wherein the non-polymerizable substance is a liquid hydrocarbon.

7. The process as defined in claim 5 wherein the unsaturated compound is a vinylidene compound having a solubility in water varying from 0.1 part to 20 parts per 100 parts of aqueous medium at room temperature.

8. The process as defined in claim 5 wherein the monomer is vinylidene chloride.

9. The process as defined in claim 5 wherein the monomer is vinyl chloride.

10. The process as defined in claim 5 wherein the non-polymerizable substance is a liquid alkane containing at least 5 carbon atoms.

11. A process for producing a relatively homogeneous copolymer of two substantially water-insoluble ethylenically unsaturated organic compounds which comprises passing liquid drops of a mixture containing the two unsaturated organic compounds and a liquid non-polymerizable substance which is miscible with the said unsaturated compounds, is only slightly miscible with the aqueous medium described hereinafter, and has the same relative densities in relation to the water aqueous as the said unsaturated compounds, in contact with and through a liquid aqueous medium which contains a water-soluble radical-yield polymerization catalyst and an emulsifying agent wherein a portion of the monomer in the drops goes into solution in the aqueous medium, heating the aqueous medium to a polymerizing temperature between 15° C. and 70° C. so as to polymerize the dissolved monomer in the aqueous medium in the presence of the water-soluble catalyst collecting all of the drops that pass through the aqueous medium at the opposite end of the reaction chamber as a separate phase in contact with the said aqueous medium, the monomer collected being at least 90% of the monomer introduced into the aqueous phase, removing part of the said collected phase to a reservoir where the concentration of the monomers and non-polymerizable substance is adjusted so as to give a copolymer having the desired composition and then circulating the adjusted liquid back to the point of introducing the drops in the aqueous medium, the movement of the said drops through the medium in the above-described process being due primarily to difference in density of the said drops and the medium, which medium is otherwise free of mechanical agitation.

12. A process as defined in claim 11 wherein the non-polymerizable substance is pentane and the monomers are vinylidene chloride and ethyl acrylate.

13. The process as defined in claim 11 wherein the monomers are vinylidene chloride and vinyl acetate.

14. A process as defined in claim 11 wherein the non-polymerizable substance is a liquid ether containing at least 6 carbon atoms.

References Cited in the file of this patent

UNITED STATES PATENTS

| | | |
|---|---|---|
| 2,179,040 | Heuer | Nov. 7, 1939 |
| 2,326,326 | Breedis | Aug. 10, 1943 |
| 2,566,567 | Hutchinson | Sept. 4, 1951 |
| 2,618,626 | Van Dijk et al. | Nov. 18, 1952 |